United States Patent
Creamer et al.

(10) Patent No.: US 7,142,653 B2
(45) Date of Patent: Nov. 28, 2006

(54) SYSTEM AND METHOD FOR PROVIDING CALLER INFORMATION ACROSS HETEROGENEOUS NETWORKS

(75) Inventors: Thomas E. Creamer, Boca Raton, FL (US); Peeyush Jaiswal, Boca Raton, FL (US); Victor S. Moore, Boynton Beach, FL (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 10/763,082

(22) Filed: Jan. 22, 2004

(65) Prior Publication Data

US 2005/0163298 A1 Jul. 28, 2005

(51) Int. Cl.
*H04M 1/56* (2006.01)
*H04M 15/06* (2006.01)
*H04M 11/00* (2006.01)

(52) U.S. Cl. .......................... 379/142.06; 379/142.04; 379/142.05; 379/142.15; 379/93.23

(58) Field of Classification Search .......... 379/142.01, 379/142.04, 142.05, 142.06, 142.07, 142.1, 379/142.15, 142.17, 88.19, 88.2, 88.21, 93.23, 379/245; 455/415

See application file for complete search history.

(56) References Cited

U.S. PATENT DOCUMENTS

| | | | |
|---|---|---|---|
| 4,277,649 A | 7/1981 | Sheinbein | 179/18 B |
| 5,276,731 A | 1/1994 | Arbel et al. | 379/211.02 |
| 5,864,612 A * | 1/1999 | Strauss et al. | 379/142.03 |
| 6,335,927 B1 | 1/2002 | Elliott et al. | 370/352 |
| 6,553,108 B1 * | 4/2003 | Felger | 379/144.01 |
| 6,665,388 B1 * | 12/2003 | Bedingfield | 379/142.01 |
| 6,668,054 B1 | 12/2003 | Contino et al. | 379/265.09 |
| 6,744,868 B1 * | 6/2004 | Mani | 379/201.02 |
| 6,771,755 B1 * | 8/2004 | Simpson | 379/142.04 |
| 6,778,647 B1 | 8/2004 | Dumas | 379/93.12 |
| 6,853,711 B1 * | 2/2005 | Brisebois et al. | 379/142.06 |
| 6,975,708 B1 | 12/2005 | Scherer | 379/88.22 |
| 2003/0007621 A1 | 1/2003 | Graves et al. | 379/219 |
| 2003/0043982 A1 | 3/2003 | Lee et al. | 379/142.01 |
| 2003/0046248 A1 | 3/2003 | Federowicz | 705/70 |
| 2003/0133553 A1 * | 7/2003 | Khakoo et al. | 379/142.01 |
| 2003/0169866 A1 | 9/2003 | Williams et al. | 379/220.01 |
| 2003/0194078 A1 | 10/2003 | Woods et al. | 379/224 |

(Continued)

FOREIGN PATENT DOCUMENTS

WO   WO 03/046784 A1   6/2003

*Primary Examiner*—Quoc Tran
(74) *Attorney, Agent, or Firm*—VanLeeuwen & VanLeeuwen; Herman Rodriguez

(57) ABSTRACT

A system and method for providing caller information across heterogeneous networks is provided. A Name Resolution Adapter (NRA) receives a message from a destination central office which includes a caller's telephone number and a call recipient's telephone number. The NRA retrieves a call recipient contract and caller authorization entries, and identifies caller fields that the call recipient is authorized to receive. The NRA includes the identified caller fields in a message to a Service Control Point (SCP), whereby the SCP retrieves caller attributes corresponding to the caller fields from a Line Information Database (LIDB). The SCP forwards the caller attributes to the NRA. In turn, the NRA includes the caller attributes in a message and forwards the message to the call recipient over a computer network. The call recipient processes a corresponding telephone call using the caller attributes that are included in the message.

45 Claims, 11 Drawing Sheets

U.S. PATENT DOCUMENTS

| | | | |
|---|---|---|---|
| 2004/0047453 A1 | 3/2004 | Fraser | 379/88.18 |
| 2004/0096046 A1* | 5/2004 | Lection et al. | 379/142.06 |
| 2004/0171372 A1* | 9/2004 | Tokudome | 455/415 |
| 2005/0069123 A1* | 3/2005 | Castro et al. | 379/265.09 |
| 2005/0163299 A1* | 7/2005 | Creamer et al. | 379/142.06 |

* cited by examiner

300

| Initiating Caller Number (305) | Name (310) | Address (315) | Alternate Billing (320) | Service Preferences (325) |
|---|---|---|---|---|
| 512-555-1212 | John Doe | 800 Anytown Dr. | 12324356 | call waiting, caller id |
| 496-123-4567 | Jane Doe | 500 Anystreet | 989865447 | three way calling |
| ⋮ | ⋮ | ⋮ | ⋮ | ⋮ |
| 654-987-4321 | Bob Doe | 310 Court Ave. | 97844675 | caller id |

330 — row 1; 335 — row 2; 340 — row 4

| Initiating Caller (360) | Call Recipient (370) | Authorizations (375) |
|---|---|---|
| 512-555-1212 | 876-543-0989 | Billing Info. — 380 |
|  | 656-789-6434 | Birth Date — 385 |
|  | 467-864-2578 | SSN. — 390 |

Figure 3B

SYSTEM AND METHOD FOR PROVIDING CALLER INFORMATION ACROSS HETEROGENEOUS NETWORKS

RELATED APPLICATION

This application is related to U.S. patent application Ser. No. 10/763,083 filed on the same day as the present application and having the same inventors and assignee.

BACKGROUND OF THE INVENTION

1. Technical Field

The present invention relates in general to a system and method for providing caller information across heterogeneous networks. More particularly, the present invention relates to a system and method for providing caller attributes to a call recipient over a computer network in order for the call recipient to effectively process the telephone call.

2. Description of the Related Art

Caller identification (caller ID) became possible with the implementation of Signaling System 7 (SS7) and is a technique to include a caller's telephone number in a telephone call to a call recipient. SS7 provides a signaling backbone for the Public Switched Telephone Network (PSTN) which transfers call information from one central office to another central office. With the implementation of SS7, it became practical to forward a caller's telephone number through the SS7 network to a central office serving a call recipient (i.e. terminating central office).

A terminating central office receives a caller's phone number, and embeds the phone number in a telephone call to the call recipient between the first and second ring of the telephone call. In some instances, a name associated with the initiating calling number is included in the transmission message. The information is sent in one of two formats which are a Single Data Message Format (SDMF) and a Multiple Data Message Format (MDMF). The SDMF includes the date, time, and a caller's telephone number. The MDMF includes the date, time, caller's telephone number, and a name associated with the caller's telephone number.

Caller ID, however, includes limited information pertaining to a caller. A challenge found is that in order for a call recipient to retrieve more information corresponding to a caller, the call recipient must have access to a local database that includes the caller's customer profile. Many call recipients, however, do not have access to a local database that includes customer profiles. For example, a service repairman may receive a telephone call on his mobile phone from a customer while he is on call. In this example, the service repairman receives the customer's phone number, but does not receive the caller's address which the service repairman needs in order to travel to the customer's residence. Since the service repairman does not have access to a local database, the service repairman is required to ask the customer his address and write the address on paper.

Furthermore, a caller may wish to provide sensitive data to a call recipient in order to avoid entering his information using his telephone. For example, a caller may frequently order merchandise from a mail order catalog in which the caller provides the mail order catalog with his credit card information. In this example, the user may wish to automatically provide the mail order catalog with his credit card information when the caller places a telephone call to the mail order catalog. A challenge found, however, is that caller ID does not provide a way for a caller to authorize a call recipient to receive the caller's sensitive data.

What is needed, therefore, is a system and method to provide valid caller information to a call recipient based upon a call recipient's request and a caller's authorization preferences.

SUMMARY

It has been discovered that the aforementioned challenges are resolved by using a name resolution adapter to access caller attributes from a centralized storage area, and provide the caller attributes to a call recipient over a computer network based upon a call recipient contract agreement and initiating caller authorization entries.

A caller places a telephone call to a call recipient using the Public Switched Telephone Network (PSTN). The caller's central office sends the telephone call to a terminating central office over a synchronous optical network (SONET). In addition, the caller's central office sends the caller's telephone number to the terminating central office over SS7. The terminating central office receives the caller's telephone number, and sends a message to a name resolution adapter. The message includes the caller's telephone number as well as the call recipient's telephone number. The name resolution adapter uses the call recipient's telephone number to look-up contract agreement information which includes caller fields that the call recipient wishes to receive. For example, a name resolution adapter service provider may have an agreement with a call recipient whereby the call recipient wishes to receive a caller's address with each incoming telephone call. In this example, the call recipient may use the caller's address to route the telephone call to a company's retail store that is nearest to the caller's address.

The name resolution adapter identifies caller fields corresponding to the call recipient's contract agreement. If one of the caller fields includes a request for sensitive caller data, such as a credit card number, the name resolution adapter verifies that the call recipient is authorized to receive the sensitive caller data. For example, a caller may authorize a mail order catalog to receive the caller's credit card information in order to avoid the caller from providing the credit card information each time the caller calls the mail order catalog.

The name resolution adapter includes the caller fields in a request to a service control point (SCP), which, in turn, retrieves caller attributes corresponding to the caller fields from a line information database (LIDB). The LIDB is included in the PSTN and is managed by one or more telephone companies. The service control point provides the caller attributes to the name resolution adapter. The name resolution adapter includes the caller attributes in a message, and sends the message to the call recipient over a computer network, such as a TCP/IP network. The call recipient correlates the caller attributes it receives from the computer network with the telephone call it receives from the PSTN.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 3A is a line information database (LIDB) look-up table that includes caller attributes that correspond to an initiating caller's telephone number;

FIG. 3B is an initiating caller authorization look-up table that includes sensitive caller authorizations corresponding to call recipients;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
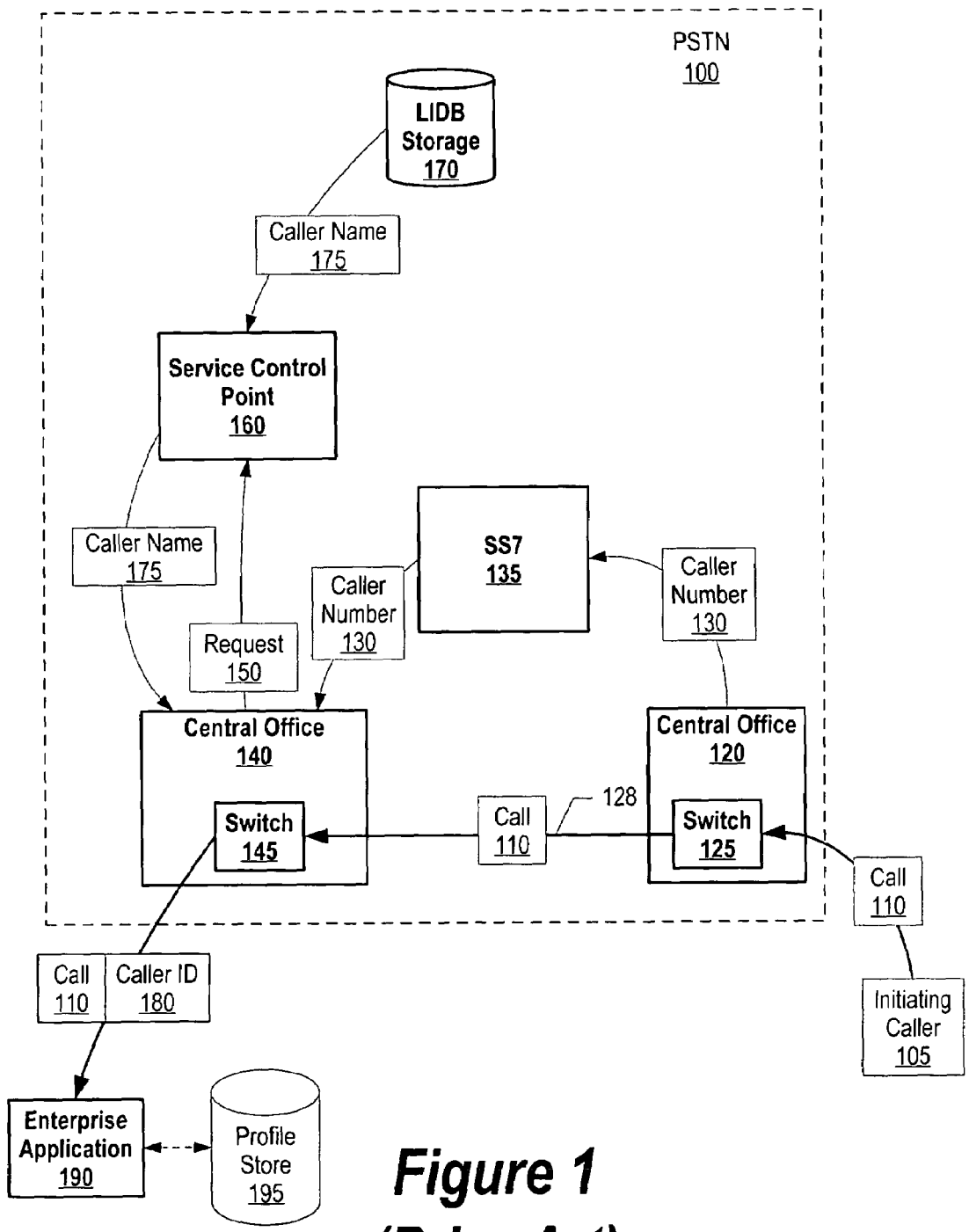
FIG. 1 is a diagram showing a call recipient's central office including an initiating caller's identification in a telephone call, and sending the initiating caller's identification to a call recipient.

FIG. 1 is a diagram showing a call recipient's central office including an initiating caller's identification in a telephone call, and sending the initiating caller's identification to a call recipient. Public switched telephone network (PSTN) 100 includes central offices 120 and 140. Central offices are typically geographically located, such as in a neighborhood or in a business park, and include a "switch" that manages calls to individual customer telephones. Central office 120 includes switch 125 which routes calls to and from initiating caller 105. Central office 140 includes switch 145 which routes calls to and from enterprise application 190. PSTN 100 also includes signaling system 7 (SS7) 135 which is the signaling backbone of PSTN 100 in that SS7 passes caller information between central offices.

Initiating caller 105 uses PSTN 100 to place a telephone call to a recipient caller, such as enterprise application 190. Enterprise application 190 is a telephone system that supports multiple phone lines. For example, imitating caller 105 may wish to call a computer manufacturer's help desk for assistance with configuring his computer.

Initiating caller 105 sends call 110 to central office 120. Central office 120 includes switch 125 which receives call 110. Central office 120 performs two functions with call 110. Its first function is to identify a destination central office that corresponds to call 110. Central office 120 identifies that call 110 corresponds to a telephone that central office 140 supports. Central office 120 sends call 110 to central office 140 over synchronous optical network (SONET) 128. Central office 120's second function is to send initiating caller 105's telephone number (e.g. caller number 130) to central office 140 through signaling system 7 135.

Central office 140 receives and correlates caller number 130 with call 110. Central office 140 then sends a request (e.g. request 150) to service control point 160 for a name that corresponds to caller number 130. Service control point 160 retrieves caller name 175 from line information database (LIDB) store 170, and sends caller name 175 to central office 140. Central office 140 includes caller name 175 and caller number 130 in caller identification 180, and sends caller identification 180 with call 110 to enterprise application 190 over a destination subscriber loop between the first and second ring by means of two modem tones. Caller ID 180 is transmitted serially in FSK mode using either a Single Data Message Format (SDMF) or a Multiple Data Message Format (MDMF). The SDMF includes the date, time, and calling number. The MDMF includes the date, time, calling number, and the name associated with the calling number. Enterprise application 190 uses caller ID 180 to retrieve caller profile information from profile store 195. Profile store 195 may be stored on a nonvolatile storage area, such as a computer hard drive.

Figure 2:
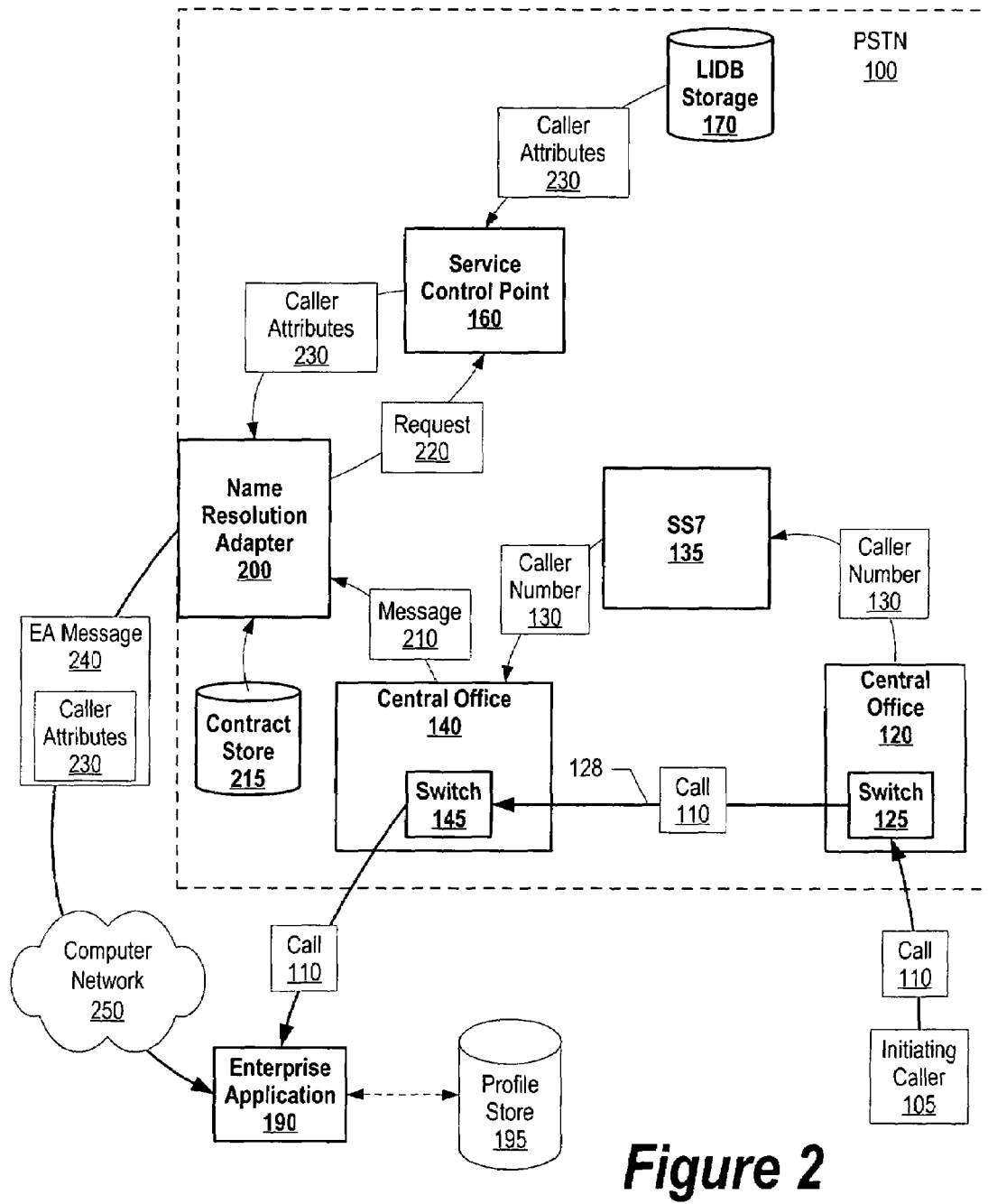
FIG. 2 is a diagram showing a name resolution adapter (NRA) providing caller attribute information to an enterprise application whereby the caller attribute information corresponds to an initiating caller.

FIG. 2 is a diagram showing a name resolution adapter (NRA) providing caller attribute information to an enterprise application whereby the caller attribute information corresponds to an initiating caller. FIG. 2 is similar to FIG. 1 with regards to sending a call (e.g. call 110) from initiating caller 105 to enterprise application 190. However, FIG. 2 is different than FIG. 1 with regards to providing caller information to enterprise application 190. The diagram in FIG. 2 shows a name resolution adapter retrieving caller attributes, such as name, address, and billing information, and sending the caller attributes to enterprise application 190 over computer network 250, such as a TCP/IP network.

Central office 140 receives caller number 130 from SS7 135, and sends message 210 to name resolution adapter 200. Message 210 includes caller number 130 as well as the call recipient's (e.g. enterprise application 190) phone number. Name resolution adapter 200 uses the call recipient's phone number to look-up contract agreement information that is located in contract store 215. A call recipient sends an agreement request to name resolution adapter 200 in order to establish a contract agreement. For example, enterprise application 190 may have a contract agreement with a name resolution adapter service provider whereby enterprise application 190 requests a name and an address that corresponds with each incoming call. In this example, enterprise application 190 may use an initiating caller's address to route a particular phone call to a company's retail store that is closest to the initiating caller's address. Contract store 215 may be stored on a nonvolatile storage area, such as a computer hard drive.

Name resolution adapter 200 identifies requested caller fields corresponding to enterprise application 190's contract agreement, and includes the requested caller fields in a request (e.g. request 220) to service control point (SCP) 160.

Service control point 160 receives request 220, and retrieves caller attributes corresponding to the requested caller fields (e.g. caller attributes 230) from line information database 170. Service control point 160 sends caller attributes 230 to name resolution adapter 200.

Name resolution adapter 200 includes caller attributes 230 in a message as well as telephone port location information that identifies which port enterprise application 190 will receive the corresponding call. Name resolution adapter 200 then sends enterprise application message 240 to enterprise application 190 over computer network 250, such as a TCP/IP network. Enterprise application 190 validates call 110 using enterprise application message 240. Enterprise application 190 then uses caller attributes 230 to retrieve caller profile information from profile store 195 to process the call (see FIGS. 8, 9, 10, and corresponding text for further details regarding enterprise application call processing). FIG. 2 shows that enterprise application 190 receives caller attributes 230 and call 110 over heterogeneous, or dissimilar networks. In an alternative embodiment, name resolution adapter 200 may send the caller attributes to central office 140 which, in turn, sends the caller attributes to enterprise application 190 over a telephone network that is used to send call 110 to enterprise application 190.

FIG. 3A is a line information database (LIDB) look-up table that includes caller attributes that correspond to an initiating caller's telephone number. A service control point accesses table 300 when the service control point receives a request from a name resolution adapter for particular caller information. For example, a name resolution adapter may request an address that corresponds to a particular telephone number (see FIG. 2 and corresponding text for further details regarding NRA requests).

Table 300 includes columns 305 through 325. Column 305 includes a list of initiating caller telephone numbers. A service control point uses information in column 305 to match a NRA request with a particular initiating caller entry. Column 310 includes a person's name that corresponds to the telephone numbers included in column 305. Column 315 includes address information that corresponds to initiating caller numbers that are shown in column 305. Information in columns 310 and 315 are the same as information listed in a telephone directory.

Column 320 includes billing information that corresponds to telephone numbers listed in column 305. For example, a person may have his phone bill charged to his credit card whereby the person's credit card information is included in column 320. In this example, a service control point may retrieve billing information from table 300 and provide the billing information to a name resolution adapter which, in turn, sends the billing information to an enterprise application. In this example, for security purposes, an agreement is in place between the initiating caller and the call recipient that allows the call recipient to receive the initiating caller's billing information. Column 325 includes service preference information corresponding to phone numbers that are included in column 305, such as call waiting, call forwarding, and three way calling.

Table 300 includes rows 330 through 340 whereby each row includes an initiating caller entry. Row 330 includes caller attributes corresponding to phone number "512-555-1212." The caller attributes include the name "John Doe", the address "800 Anytown Dr.", alternate billing "12324356", and service preferences "call waiting" and "caller id." Row 335 includes caller attributes corresponding to phone number "496-123-4567." The caller attributes include the name "Jane Doe", the address "500 Anystreet", alternate billing "989865447", and service preferences "three way calling." Row 340 includes caller attributes corresponding to phone number "654-987-4321." The caller attributes include the name "Bob Doe", the address "310 Court Ave.", alternate billing "97844675", and service preferences "caller id."

FIG. 3B is an initiating caller authorization look-up table that includes sensitive caller authorizations corresponding to call recipients. For example, an initiating caller may wish a mail order catalog to receive the initiating caller's credit card information when the initiating caller places a call to the mail order catalog. In this example, the initiating caller configures an authorization entry at a name resolution adapter service provider to authorize the name resolution service provider to provide the credit card information to the call recipient.

Table 350 includes columns 360, 370, and 375. Column 360 includes the telephone number of an initiating caller which has configured authorizations corresponding to call recipients (see FIG. 7 and corresponding text for further details regarding call recipient authorization configuration). Column 370 includes call recipient identities (e.g. telephone numbers) that correspond to caller authorizations. As one skilled in the art can appreciate, other call recipient identities may be used to associate a call recipient with a caller authorization, such as the call recipient's name.

Column 375 includes sensitive caller data authorizations corresponding to call recipient identities located in column 370. Row 380 shows that call recipient "876-543-0989" is authorized to receive "Billing Information" corresponding to initiating caller "512-555-1212." Row 385 shows that call recipient "656-789-6434" is authorized to receive "Birth Date" information corresponding to initiating caller "512-555-1212." And, row 390 shows that call recipient "467-864-2578" is authorized to receive "Social Security Number" information corresponding to initiating caller "512-555-1212."

Figure 4:
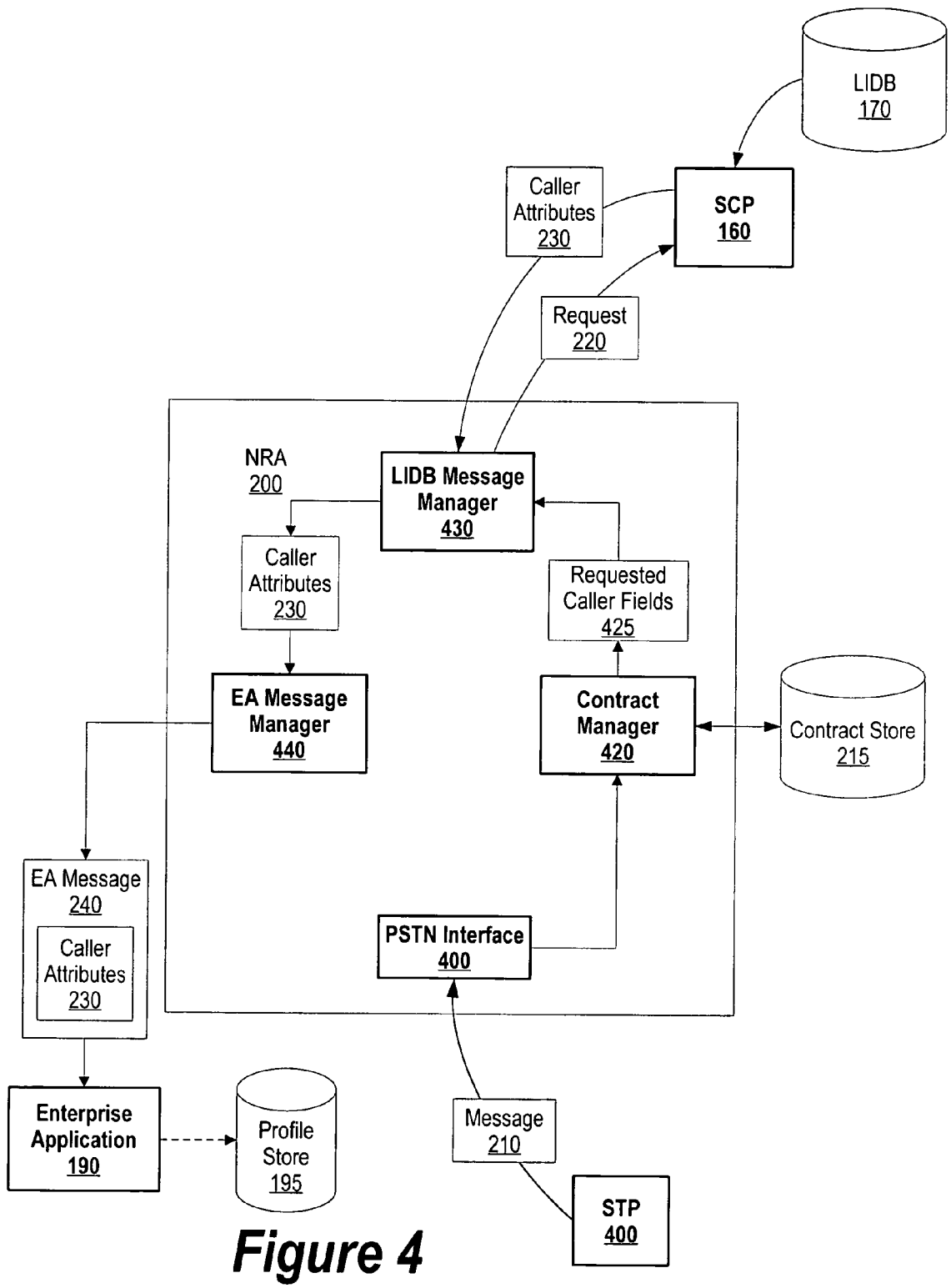
FIG. 4 is a diagram showing high-level functional blocks that are included in a name resolution adapter (NRA)

FIG. 4 is a diagram showing high-level functional blocks that are included in a name resolution adapter (NRA). NRA 200 includes PSTN interface 400 which receives message 210 from service termination point 400. Message 210 includes an initiating caller's number and a call recipient's number. Message 210 may be formatted in a standard format, such as an Initial Address Message Transaction Capability Application Part (IAM TCAP). PSTN interface 400 passes the initiating caller's phone number and the call recipient's phone number to contract manager 420. Contract manager 420 looks up contract information corresponding to the call recipient's phone number in contract store 215. For example, NRA 200 may have a contract agreement with a call recipient to provide an initiating caller's address with each incoming telephone call.

Contract manager 420 retrieves requested caller fields from contract store 215, and contract manager 420 passes requested caller fields 425 to line information database (LIDB) message manager 430. LIDB message manager 430 includes requested caller fields 425 in request 220, and sends request 220 to service control point (SCP) 160. Request 220 may be formatted in a standard format, such as TCAP. SCP 160 retrieves caller attributes from LIDB store 170, and sends caller attributes 230 to LIDB message manager 430. LIDB message manager 430 forwards caller attributes 230 to enterprise application message manager 440.

Enterprise application message manager 440 includes caller attributes 230 in EA message 240, along with a telephone port location that identifies the port at which enterprise application 190 receives the corresponding call.

Enterprise application message manager then sends EA message 240 to enterprise application 190 over a TCP/IP network connection.

Figure 5:
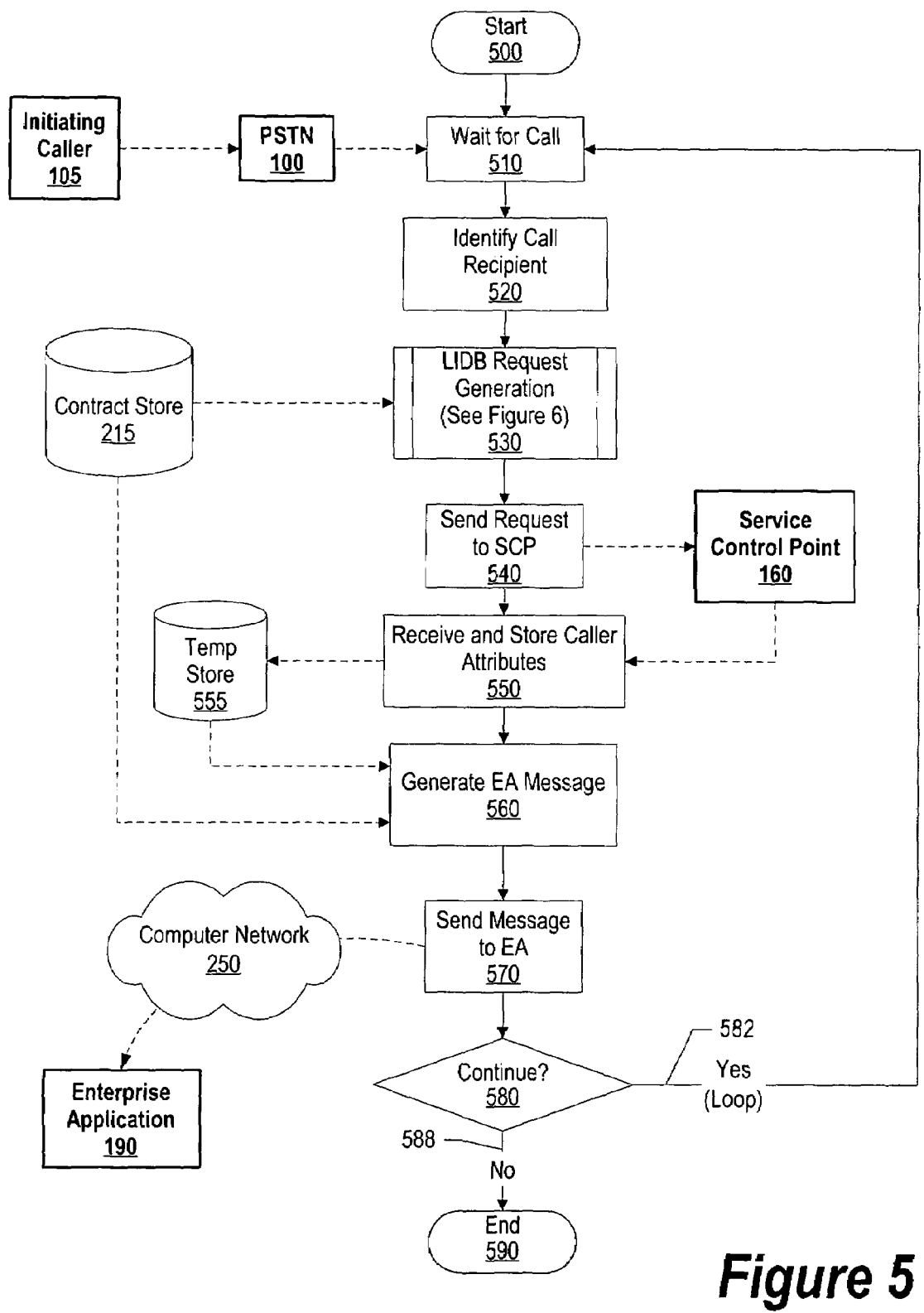
FIG. 5 is a high-level flowchart showing steps taken in a name resolution adapter (NRA) receiving initiating caller attributes from a service control point, and sending the caller attributes to an enterprise application (EA)

FIG. 5 is a high-level flowchart showing steps taken in a name resolution adapter (NRA) receiving initiating caller attributes from a service control point, and sending the caller attributes to an enterprise application (EA). Processing commences at 500, whereupon the NRA waits for a call from initiating caller 105 through PSTN 100 at step 510. Initiating caller 105 and PSTN 100 are the same as that shown in FIG. 1. When the NRA receives a call, the NRA identifies a recipient of initiating caller 105's telephone call at step 520. For example, initiating caller 105 may be calling a company's customer support line.

Figure 6:
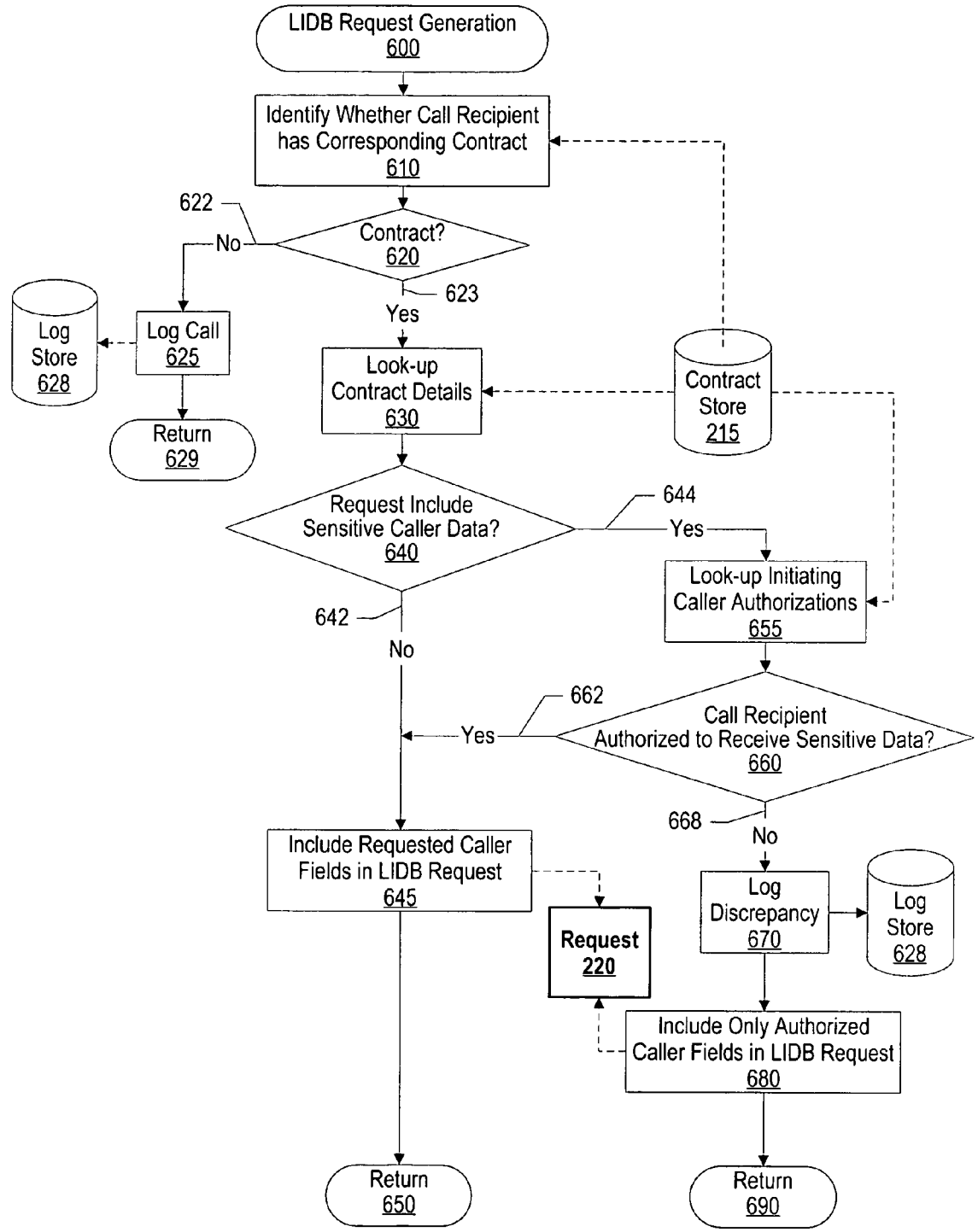
FIG. 6 is a flowchart showing steps taken in a name resolution adapter (NRA) generating a line information database (LIDB) request based upon a call recipient contract agreement and initiating caller authorization agreements.

At step 530, NRA processing identifies a contract agreement that corresponds to the call recipient, retrieves requested caller fields from contract store 215, and generates a line information database (LIDB) request using the requested caller fields (pre-defined process block, see FIG. 6 and corresponding text for further details). NRA processing sends the LIDB request to service control point 160 at step 540. In turn, NRA processing receives caller attributes corresponding to the LIDB request from service control point 160, and stores the caller attributes in temp store 555 (step 550).

NRA processing includes the caller attributes received from temporary store 555 and caller fields from contract store 215 in an enterprise application (EA) message at step 560. Processing sends the EA message to enterprise application 190 through computer network 250 at step 570. EA application 190 receives the EA message, and associates the caller attributes with initiating caller 105's telephone call (see FIGS. 2, 8, and corresponding text for further details regarding enterprise application call processing).

A determination is made as to whether to continue processing telephone calls (decision 580). If processing should continue, decision 580 branches to "Yes" branch 582 which loops back to process another call. This looping continues until NRA call processing should stop, at which point decision 580 branches to "No" branch 588 whereupon processing ends at 590.

FIG. 6 is a flowchart showing steps taken in a name resolution adapter (NRA) generating a line information database (LIDB) request based upon a call recipient contract agreement and initiating caller authorization agreements. LIDB request generation processing commences at 600, whereupon processing identifies at 610 whether the call recipient has a contract agreement with the NRA service provider by accessing a contract look-up table located in contract store 215. For example, a company may have a contract with an NRA service provider whereby the service provider provides an initiating caller's name and address with each telephone call.

A determination is made as to whether the call recipient has an existing contract agreement (decision 620). If the call recipient does not have an existing contract agreement, decision 620 branches to "No" branch 622 whereby processing logs call information in log store 628 at step 625. In one embodiment, the name resolution adapter increments a counter to track the number of times that it receives a message corresponding to a particular call recipient. The name resolution adapter service provider may use the counter and logged information to show a potential customer the number of calls the potential customer could receive that would include caller attribute information. Log store 628 may be stored on a nonvolatile storage area, such as a computer hard drive. Processing returns at 629.

On the other hand, if the call recipient has an existing contract agreement with the NRA service provider, decision 620 branches to "Yes" branch 623 whereupon at step 630 processing looks up requested caller fields corresponding to the contract agreement located in contract store 215. Contract store 215 is the same as that shown in FIG. 2 and may be stored on a nonvolatile storage area, such as a computer hard drive.

At 640, a determination is made as to whether one or more of the call recipient's requested caller fields correspond to sensitive caller data. For example, a call recipient may request the initiating caller's credit card number. If the call recipient does not request sensitive caller data, decision 640 branches to "No" branch 642 whereupon processing includes each requested caller field in request 220 at step 645, and processing returns at 650.

On the other hand, if one or more of the call recipient's requested caller fields corresponds to sensitive caller data, decision 640 branches to "Yes" branch 644 whereupon processing looks up initiating caller authorization agreements in contract store 215 (step 665). Using the example described above, an initiating caller may authorize the call recipient to authorize the call recipient to receive the initiating caller's credit card number (see FIG. 3B and corresponding text for further details regarding initiating caller authorization details).

A determination is made as to whether the initiating caller authorizes the call recipient to receive sensitive caller data (decision 660). If the call recipient is authorized to receive the initiating caller's sensitive caller data, decision 660 branches to "Yes" branch 662 whereupon processing includes each requested caller field in request 220 (step 645). On the other hand, if the call recipient is not authorized to receive sensitive caller data, decision 660 branches to "No" branch 668 whereupon processing logs the discrepancy in log store 628 in order to provide the discrepancy information to a call recipient. Processing includes only authorized requested caller fields in request 220 at step 680, and processing returns at 690.

Figure 7:
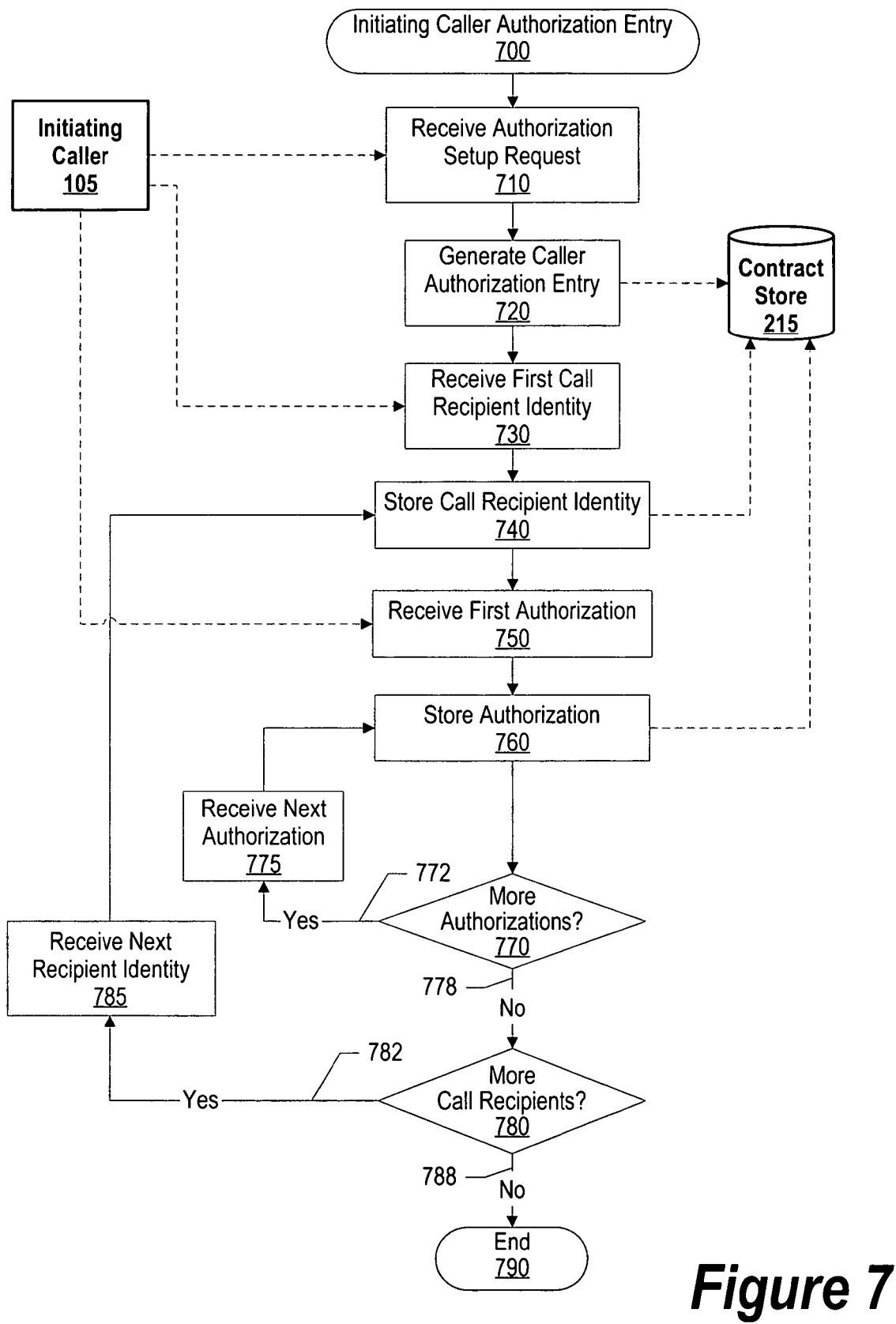
FIG. 7 is a flowchart showing steps taken in an initiating caller configuring authorization entries that authorize call recipients to receive sensitive caller data.

FIG. 7 is a flowchart showing steps taken in an initiating caller configuring authorization entries that authorize call recipients to receive sensitive caller data. For example, an initiating caller may wish a mail order catalog to receive the initiating caller's credit card information when the initiating caller places a call to the mail order catalog. In this example, the initiating caller configures an authorization entry at a name resolution adapter service provider to authorize the name resolution service provider to provide the credit card information to the call recipient.

Processing commences at 700, whereupon processing receives an authorization setup request from initiating caller 105 (step 710). Initiating caller 105 is the same as that shown in FIG. 1. At step 720, processing generates a caller authorization entry in an authorization look-up table stored in contract store 215 (see FIG. 3B and corresponding text for further details regarding authorization table properties). Contract store 215 is the same as that shown in FIG. 2.

Processing receives a first call recipient identity from initiating caller 105, such as the call recipient's phone number, at step 730, and stores the call recipient's identity in the authorization look-up table located in contract store 215 (step 740). Processing then receives a first authorization (i.e. credit card authorization) to correspond to the first call recipient identity at step 750, and stores the first authorization in the authorization look-up table stored in contract store 215 (step 760).

A determination is made as to whether initiating caller 105 wishes to add more authorizations to correspond to the first call recipient (decision 770). For example, initiating caller 105 may wish to authorize the first call recipient to receive the initiating caller's social security number. If initiating caller 105 wishes to add more authorizations to correspond to the first call recipient, decision 770 branches to "Yes" branch 772 whereupon processing receives (step 775) and processes the next authorization to correspond to the first call recipient. This looping continues until initiating caller 105 does not wish to add more authorizations to the first call recipient, at which point decision 770 branches to "No" branch 778 whereupon a determination is made as to whether initiating caller 105 wishes to configure authorizations for additional call recipients (decision 780). If initiating caller wishes to configure authorizations for additional call recipients, decision 780 branches to "Yes" branch 782 whereupon processing receives (step 785) and processes a second call recipient's authorizations. This looping continues until there are no more call recipients to process, at which point decision 780 branches to "No" branch 788 whereupon processing ends at 790.

Figure 8:
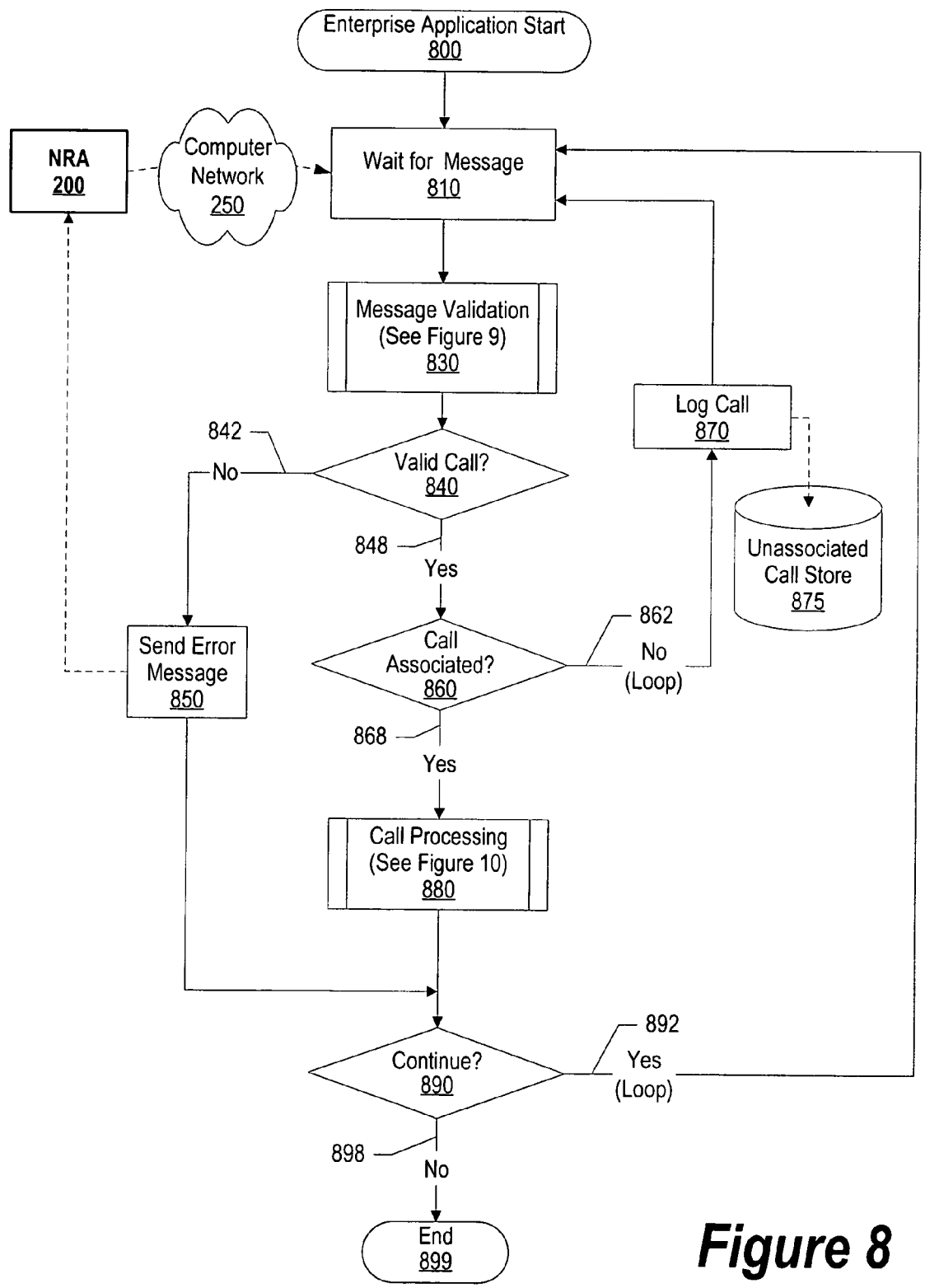
FIG. 8 is a flowchart showing steps taken in an enterprise application (EA) processing a call using caller attributes it receives from a name resolution adapter (NRA)

FIG. 8 is a flowchart showing steps taken in an enterprise application (EA) processing a call using caller attributes it receives from a name resolution adapter (NRA). Enterprise application processing commences at 800, whereupon the enterprise application waits for a message from name resolution adapter 200 through computer network 250 (step 810). The message includes one or more customer identifiers, such as caller attributes, and corresponds to a call from an initiating caller. Name resolution adapter 200 and computer network 250 are the same as those shown in FIG. 2.

Figure 9:
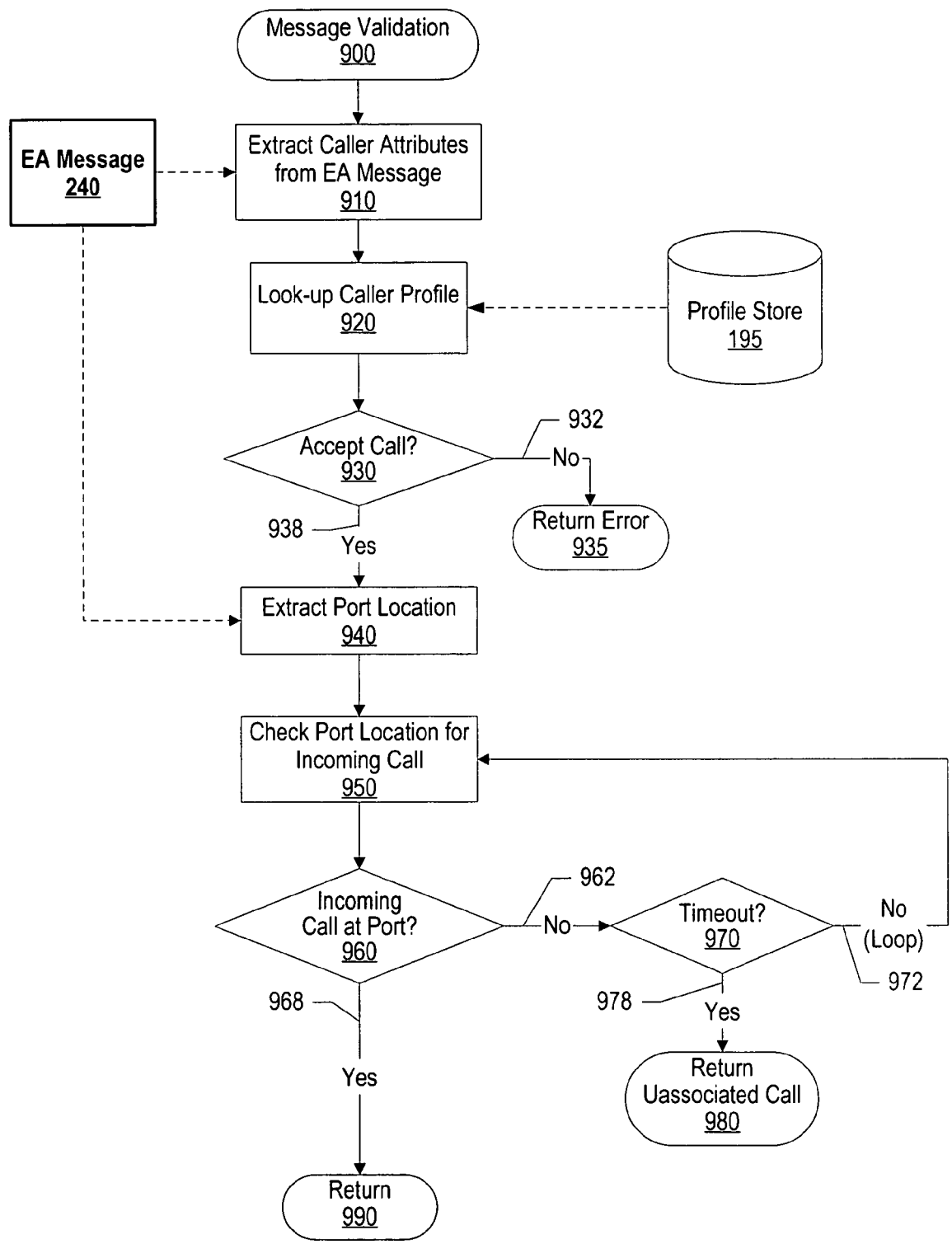
FIG. 9 is a flowchart showing steps taken in an enterprise application validating a message that corresponds to an incoming call.

The enterprise application validates the call using the caller attributes and also verifies that the call is present on a specified telephone port (pre-defined process block 830, see FIG. 9 and corresponding text for further details). For example, a company's customer support telephone system may identify that caller is calling from a long distance telephone based upon caller attributes and decides not to accept the call in order to avoid long distance charges on its 1-800 telephone line.

A determination is made as to whether the call corresponding to the message is valid based upon profile attributes (decision 840). If the call is not valid, decision 840 branches to "No" branch 842 whereupon at step 850 processing sends an error message to name resolution adapter 200 which, in turn, provides the error message to the caller. For example, processing may play a recording to the caller as to which number to dial based upon the caller's address.

On the other hand, if the call is valid, decision 840 branches to "Yes" branch 848 whereupon a determination is made as to whether the telephone port corresponding to the message is receiving a call (decision 860). If the port corresponding to the message is not receiving an incoming call, decision 860 branches to "No" branch 862 which loops back to log the call discrepancy in unassociated call store 875 (step 870), and wait for another message. This looping continues until a telephone port corresponding to a message includes an incoming call, at which point decision 860 branches to "Yes" branch 868 whereupon the enterprise application processes the call (pre-defined process block 880, see FIG. 10 and corresponding text for further details).

A determination is made as to whether to continue processing incoming messages (decision 890). If processing should continue to process incoming messages, decision 890 branches to "Yes" branch 892 which loops back to process more messages. This looping continues until the enterprise application does not wish to process more incoming messages, at which point decision 890 branches to "No" branch 898 whereupon processing ends at 899.

FIG. 9 is a flowchart showing steps taken in an enterprise application validating a telephone call that corresponds to an incoming message. Processing commences at 900, whereupon processing extracts caller attributes from enterprise application message 240 at step 910. Enterprise message 240 is the same as that shown in FIG. 2. At step 920, processing uses the caller attributes, such as the caller's name, to look-up a caller profile in profile store 195. For example, the enterprise application may support a banking telephone system whereby the enterprise application looks-up the caller's account information. Profile store 195 is the same as that shown in FIG. 1.

A determination is made as to whether to accept the call based upon the caller's profile information (decision 930). For example, if the caller does not have an account with the bank, the enterprise application may not accept the call. If the enterprise application should not accept the call, decision 930 branches to "No" branch 932 whereupon processing returns an error at 935. On the other hand, if processing should accept the call, decision 930 branches to "Yes" branch 938 whereupon processing extracts telephone port location information from enterprise application 240 at step 940. The telephone port location information corresponds to which port (i.e. circuit) the enterprise application should receive the corresponding call.

Processing checks the identified port location for an incoming call at step 950, and a determination is made as to whether a call is present at the specified port location (decision 960). If a call is present at the specified port location, decision 960 branches to "Yes" branch 968 whereupon processing returns at 990. If a call is not present at the specified port location, decision 960 branches to "No" branch 962 whereupon a determination is made as to whether processing should wait for the incoming call (decision 970). For example, processing may set a timer for two seconds whereby processing waits for two seconds after it receives a message to look for a corresponding call.

If processing should wait for the incoming call, decision 970 branches to "No" branch 972 whereupon processing loops back to check for the corresponding call at the specified port location. This looping continues until processing's timer times out, at which point decision 970 branches to "Yes" branch 978 whereupon processing returns an "unassociated call" at 980.

Figure 10:
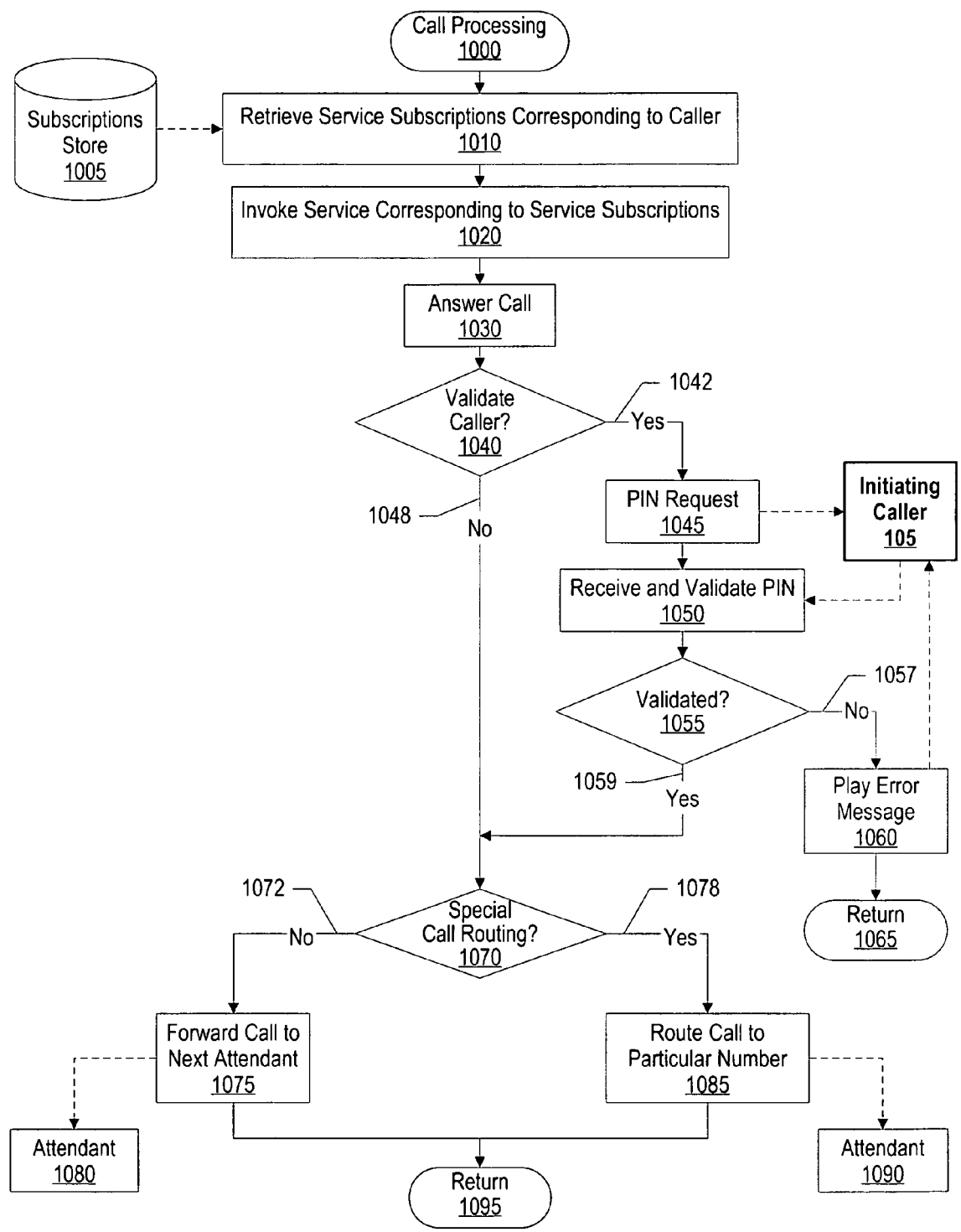
FIG. 10 is a flowchart showing steps taken in an enterprise application processing a call.

FIG. 10 is a flowchart showing steps taken in an enterprise application processing a call. Call processing commences at 1000, whereupon processing retrieves subscriptions corresponding to the caller from subscriptions store 1005 (step 1010). For example, processing may retrieve a level of service for a caller that permits him to check billing information, but his level of service does not permit him to buy anything. Processing invokes a service corresponding to the service subscriptions at step 1020. Using the example described above, processing may configure permissions and associate the permissions to the call which allows the caller to check billing information but not buy anything.

The enterprise application answers the call at step 1030, whereupon a determination is made as to whether to validate the caller (decision 1040). For example, a banking application may require a user to enter a PIN in order to authenticate the user. If processing does not need to validate the caller, decision 1040 branches to "No" branch 1048 bypassing caller validation steps. On the other hand, if processing should validate the caller, decision 1040 branches to "Yes"

branch 1042 whereupon processing requests a PIN from initiating caller 105 at step 1045. Initiating caller 105 is the same as that shown in FIG. 1.

Processing receives a PIN from initiating caller 105 at step 1050, and a determination is made as to whether initiating caller 105 entered the correct PIN (decision 1055). If initiating caller 105 did not enter the correct PIN, decision 1055 branches to "No" branch 1057 whereupon processing plays an error message to initiating caller 105 at step 1060, and processing returns to receive more calls at 1065 (see FIG. 8 and corresponding text for further details). On the other hand, if initiating caller 105 did enter the correct PIN, decision 1055 branches to "Yes" branch 1059.

A determination is made as to whether the caller requires special routing to a particular extension (decision 1070). For example, a caller may have previously spoken to a particular attendant and the enterprise application wishes to route the caller's call to the same attendant. If the call requires special routing, decision 1070 branches to "Yes" branch 1078 whereupon processing forwards the call to a particular number (step 1085), such as attendant 1090's number, and processing returns to receive more calls at 1095 (see FIG. 8 and corresponding text for further details). On the other hand, if the call does not require special routing, decision 1070 branches to "No" branch 1072 whereupon processing routes the call to the next attendant (step 1075), such as attendant 1080's number, and processing returns to receive more calls at 1095 (see FIG. 8 and corresponding text for further details).

Figure 11:
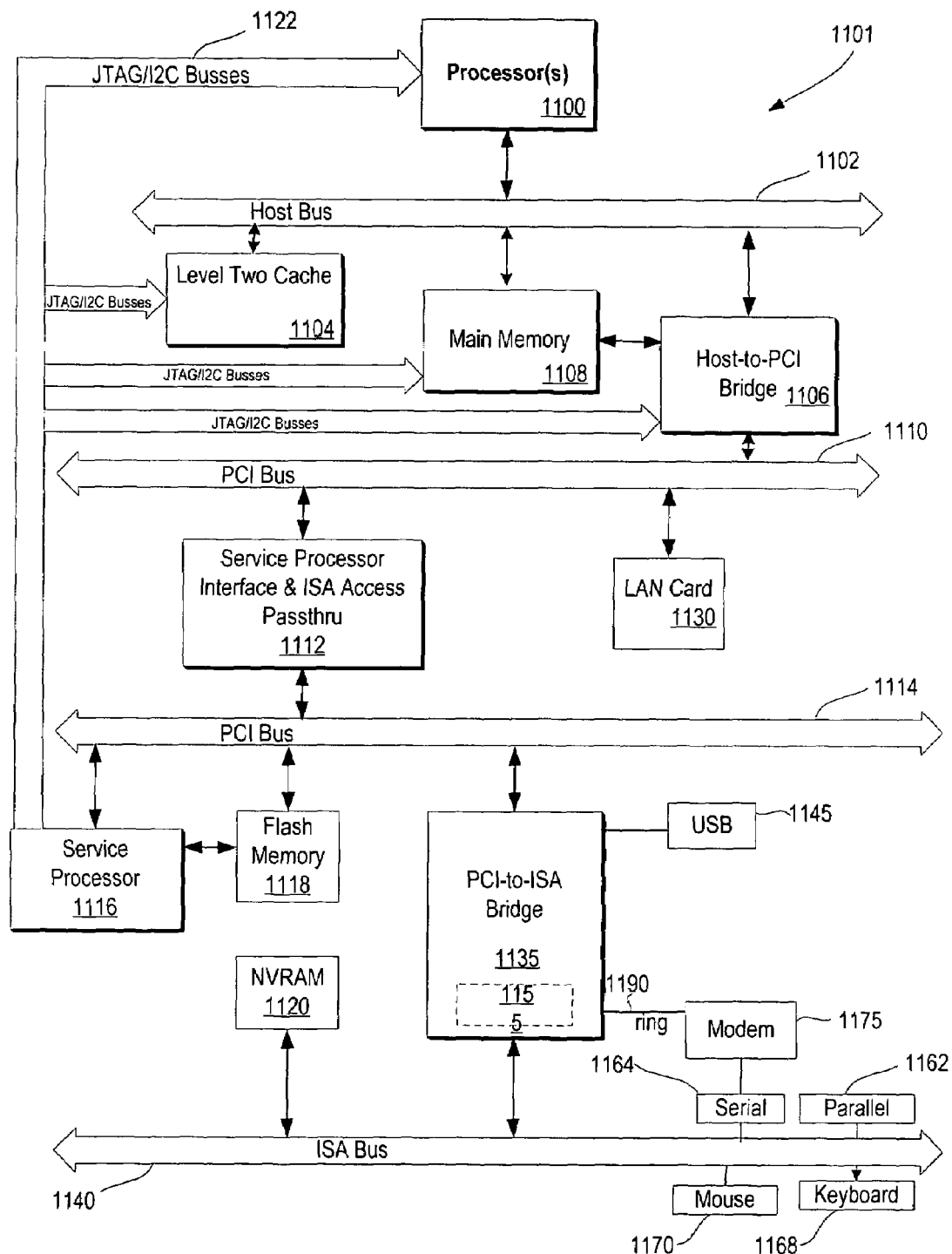
FIG. 11 is a block diagram of an information handling system capable of implementing the present invention.

FIG. 11 illustrates information handling system 1101 which is a simplified example of a computer system capable of performing the computing operations described herein. Computer system 1101 includes processor 1100 which is coupled to host bus 1102. A level two (L2) cache memory 1104 is also coupled to host bus 1102. Host-to-PCI bridge 1106 is coupled to main memory 1108, includes cache memory and main memory control functions, and provides bus control to handle transfers among PCI bus 1110, processor 1100, L2 cache 1104, main memory 1108, and host bus 1102. Main memory 1108 is coupled to Host-to-PCI bridge 1106 as well as host bus 1102. Devices used solely by host processor(s) 1100, such as LAN card 1130, are coupled to PCI bus 1110. Service Processor Interface and ISA Access Pass-through 1112 provides an interface between PCI bus 1110 and PCI bus 1114. In this manner, PCI bus 1114 is insulated from PCI bus 1110. Devices, such as flash memory 1118, are coupled to PCI bus 1114. In one implementation, flash memory 1118 includes BIOS code that incorporates the necessary processor executable code for a variety of low-level system functions and system boot functions.

PCI bus 1114 provides an interface for a variety of devices that are shared by host processor(s) 1100 and Service Processor 1116 including, for example, flash memory 1118. PCI-to-ISA bridge 1135 provides bus control to handle transfers between PCI bus 1114 and ISA bus 1140, universal serial bus (USB) functionality 1145, power management functionality 1155, and can include other functional elements not shown, such as a real-time clock (RTC), DMA control, interrupt support, and system management bus support. Nonvolatile RAM 1120 is attached to ISA Bus 1140. Service Processor 1116 includes JTAG and I2C busses 1122 for communication with processor(s) 1100 during initialization steps. JTAG/I2C busses 1122 are also coupled to L2 cache 1104, Host-to-PCI bridge 1106, and main memory 1108 providing a communications path between the processor, the Service Processor, the L2 cache, the Host-to-PCI bridge, and the main memory. Service Processor 1116 also has access to system power resources for powering down information handling device 1101.

Peripheral devices and input/output (I/O) devices can be attached to various interfaces (e.g., parallel interface 1162, serial interface 1164, keyboard interface 1168, and mouse interface 1170 coupled to ISA bus 1140. Alternatively, many I/O devices can be accommodated by a super I/O controller (not shown) attached to ISA bus 1140.

In order to attach computer system 1101 to another computer system to copy files over a network, LAN card 1130 is coupled to PCI bus 1110. Similarly, to connect computer system 1101 to an ISP to connect to the Internet using a telephone line connection, modem 1175 is connected to serial port 1164 and PCI-to-ISA Bridge 1135.

While the computer system described in FIG. 11 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method of providing caller information, said method comprising:
   receiving a message corresponding to a telephone call, wherein the message includes an initiating caller number and a call recipient number, the telephone call received over a telephone network;
   retrieving one or more caller attributes based upon the initiating caller number, wherein the caller attributes are selected from the group consisting of a name, an address, billing information, service preferences, a birth date, and a social security number; and
   sending the caller attributes to a call recipient over a computer network, the call recipient corresponding to the call recipient number.

2. The method of claim 1 further comprising:
   sending a request that includes one or more requested caller fields, the requested caller fields corresponding to the initiating caller number.

3. The method of claim 2 further comprising:
   retrieving a call recipient agreement corresponding to the call recipient number;
   selecting the requested caller fields included in the call recipient agreement; and
   including the requested caller fields in the request.

4. The method of claim 2 wherein the request is received by a service control point, and wherein the service control point is adapted to retrieve the caller attributes from a line information database and send the retrieved caller attributes back to the requestor.

5. The method of claim 1 further comprising:
   receiving an authorization request from an initiating caller prior to receiving the message, wherein the authorization request includes authorizations that identify one or more call recipients and caller data that are authorized to be sent to the identified call recipients, the initiating caller corresponding to the initiating caller number; and
   storing the authorizations in an authorization table entry.

6. The method of claim 5 further comprising:
   identifying one or more requested caller fields corresponding to the initiating caller number;
   detecting whether one of the requested caller fields corresponds to sensitive caller data, the sensitive caller data corresponding to the initiating caller number;
   checking one or more authorization table entries corresponding to the initiating caller number in response to the detecting;
   determining whether the call recipient is authorized to receive the sensitive caller data in response to the checking;
   including one or more of the requested caller fields in a request in response to the determination; and
   sending the request to a service control point.

7. The method of claim 6 further comprising:
   logging a caller data discrepancy in response to the determining, the caller data discrepancy including the requested caller fields corresponding to the sensitive caller data.

8. The method of claim 5 wherein the authorization request includes a PIN, the method further comprising:
   retrieving a stored PIN; and
   comparing the received PIN with the stored PIN wherein the receiving of authorizations is performed in response to successful comparison.

9. The method as described in claim 5 wherein at least one of the authorizations is selected from the group consisting of a birth date, billing information, and a social security number.

10. The method of claim 1 further comprising:
    determining that a call recipient agreement does not exist corresponding to the call recipient;
    retrieving a counter corresponding to the call recipient;
    incrementing the counter; and
    storing the incremented counter.

11. The method of claim 1 further comprising:
    sending the telephone call to the call recipient over the telephone network.

12. The method of claim 1 wherein the computer network is a TCP/IP network.

13. The method of claim 12 wherein the TCP/IP network includes the Internet.

14. An information handling system comprising:
    one or more processors;
    a memory accessible by the processors;
    one or more nonvolatile storage devices accessible by the processors;
    a telephone network;
    a computer network; and
    a caller information tool for providing caller information, the caller information tool comprising software code effective to:
       receive a message corresponding to a telephone call, wherein the message includes an initiating caller number and a call recipient number, the telephone call received over the telephone network;
       retrieve one or more caller attributes from one of the nonvolatile storage devices based upon the initiating caller number, wherein the caller attributes are selected from the group consisting of a name, an address, billing information, service preferences, a birth date, and a social security number; and
       send the caller attributes to a call recipient over the computer network, the call recipient corresponding to the call recipient number.

15. The information handling system of claim 14 wherein the software code is further effective to:
    send a request that includes one or more requested caller fields, the requested caller fields corresponding to the initiating caller number.

16. The information handling system of claim 15 wherein the software code is further effective to:
    retrieve a call recipient agreement corresponding to the call recipient number from one of the nonvolatile storage devices;
    select the requested caller fields included in the call recipient agreement; and
    include the requested caller fields in the request.

17. The information handling system of claim 15 wherein the request is received by a service control point, and wherein the service control point is adapted to retrieve the caller attributes from a line information database and send the retrieved caller attributes back to the requestor.

18. The information handling system of claim 14 wherein the software code is further effective to:
    receive an authorization request from an initiating caller prior to receiving the message, wherein the authorization request includes authorizations that identify one or more call recipients and caller data that are authorized to be sent to the identified call recipients, the initiating caller corresponding to the initiating caller number; and store the authorizations in an authorization table entry located in one of the nonvolatile storage devices.

19. The information handling system of claim 18 wherein the software code is further effective to:
identify one or more requested caller fields corresponding to the initiating caller number;
detect whether one of the requested caller fields corresponds to sensitive caller data, the sensitive caller data corresponding to the initiating caller number;
check one or more authorization table entries located in one of the nonvolatile storage devices corresponding to the initiating caller number in response to the detecting;
determine whether the call recipient is authorized to receive the sensitive caller data in response to the checking;
include one or more of the requested caller fields in a request in response to the determination; and
send the request to a service control point.

20. The information handling system of claim 19 wherein the software code is further effective to:
log a caller data discrepancy in one of the nonvolatile storage devices in response to the determining, the caller data discrepancy including the requested caller fields corresponding to the sensitive caller data.

21. The information handling system of claim 18 wherein the authorization request includes a PIN, and wherein the software code is further effective to:
retrieve a stored PIN from one of the nonvolatile storage devices; and
compare the received PIN with the stored PIN wherein the receiving of authorizations is performed in response to successful comparison.

22. The information handling system as described in claim 18 wherein at least one of the authorizations is selected from the group consisting of a birth date, billing information, and a social security number.

23. The information handling system of claim 14 wherein the software code is further effective to:
determine that a call recipient agreement does not exist corresponding to the call recipient;
retrieve a counter corresponding to the call recipient from one of the nonvolatile storage devices;
increment the counter; and
store the incremented counter in one of the nonvolatile storage devices.

24. The information handling system of claim 14 wherein the software code is further effective to:
send the telephone call to the call recipient over the telephone network.

25. The information handling system of claim 14 wherein the computer network is a TCP/IP network.

26. The information handling system of claim 25 wherein the TCP/IP network includes the Internet.

27. A computer program product stored on a computer operable media for providing caller information, said computer program product comprising software code effective to:
receive a message corresponding to a telephone call, wherein the message includes an initiating caller number and a call recipient number, the telephone call received over a telephone network;
retrieve one or more caller attributes based upon the initiating caller number, wherein the caller attributes are selected from the group consisting of a name, an address, billing information, service preferences, a birth date, and a social security number; and
send the caller attributes to a call recipient over a computer network, the call recipient corresponding to the call recipient number.

28. The computer program product of claim 27 wherein the software code is further effective to:
send a request that includes one or more requested caller fields, the requested caller fields corresponding to the initiating caller number.

29. The computer program product of claim 28 wherein the software code is further effective to:
retrieve a call recipient agreement corresponding to the call recipient number;
select the requested caller fields included in the call recipient agreement; and
include the requested caller fields in the request.

30. The computer program product of claim 28 wherein the request is received by a service control point, and wherein the service control point is adapted to retrieve the caller attributes from a line information database and send the retrieved caller attributes back to the requestor.

31. The computer program product of claim 27 wherein the software code is further effective to:
receive an authorization request from an initiating caller prior to receiving the message, wherein the authorization request includes authorizations that identify one or more call recipients and caller data that are authorized to be sent to the identified call recipients, the initiating caller corresponding to the initiating caller number; and
store the authorizations in an authorization table entry.

32. The computer program product of claim 31 wherein the software code is further effective to:
identify one or more requested caller fields corresponding to the initiating caller number;
detect whether one of the requested caller fields corresponds to sensitive caller data, the sensitive caller data corresponding to the initiating caller number;
check one or more authorization table entries corresponding to the initiating caller number in response to the detecting;
determine whether the call recipient is authorized to receive the sensitive caller data in response to the checking;
include one or more of the requested caller fields in a request in response to the determination; and
send the request to a service control point.

33. The computer program product of claim 32 wherein the software code is further effective to:
log a caller data discrepancy in response to the determining, the caller data discrepancy including the requested caller fields corresponding to the sensitive caller data.

34. The computer program product of claim 31 wherein the authorization request includes a PIN, and wherein the software code is further effective to:
retrieve a stored PIN; and
compare the received PIN with the stored PIN wherein the receiving of authorizations is performed in response to successful comparison.

35. The computer program product as described in claim 31 wherein at least one of the authorizations is selected from the group consisting of a birth date, billing information, and a social security number.

36. The computer program product of claim 27 wherein the software code is further effective to:
determine that a call recipient agreement does not exist corresponding to the call recipient;
retrieve a counter corresponding to the call recipient;
increment the counter; and
store the incremented counter.

37. The computer program product of claim 27 wherein the software code is further effective to:
send the telephone call to the call recipient over the telephone network.

38. The computer program product of claim 27 wherein the computer network is a TCP/IP network.

39. The computer program product of claim 38 wherein the TCP/IP network includes the Internet.

40. A computer implemented method of providing caller information, said method comprising:
receiving a message corresponding to a telephone call, wherein the message includes an initiating caller number and a call recipient number, the telephone call received over a telephone network;
retrieving the name of the initiating caller and one or more additional caller attributes corresponding to the initiating caller, wherein at least one of the additional caller attributes is selected from the group consisting of an address, billing information, service preferences, a birth date, and a social security number; and
sending the additional caller attributes to a call recipient over the telephone network, the call recipient corresponding to the call recipient number.

41. The method of claim 40 wherein the call recipient is adapted to display one or more of the additional caller attributes on a display.

42. An information handling system comprising:
one or more processors;
a memory accessible by the processors;
one or more nonvolatile storage devices accessible by the processors;
a telephone network; and
a caller information tool for providing caller information, the caller information tool comprising software code effective to:
receive a message corresponding to a telephone call, wherein the message includes an initiating caller number and a call recipient number, the telephone call received over the telephone network;
retrieve the name of the initiating caller and one or more additional caller attributes corresponding to the initiating caller from one of the nonvolatile storage devices, wherein at least one of the additional caller attributes is selected from the group consisting of an address, billing information, service preferences, a birth date, and a social security number; and
send the additional caller attributes to a call recipient over the telephone network, the call recipient corresponding to the call recipient number.

43. The information handling system of claim 42 wherein the call recipient is adapted to display one or more of the additional caller attributes on a display.

44. A computer program product stored on a computer operable media for providing caller information, said computer program product comprising software code effective to:
receive a message corresponding to a telephone call, wherein the message includes an initiating caller number and a call recipient number, the telephone call received over a telephone network;
retrieve the name of the initiating caller and one or more additional caller attributes corresponding to the initiating caller, wherein at least one of the additional caller attributes is selected from the group consisting of an address, billing information, service preferences, a birth date, and a social security number; and
send the additional caller attributes to a call recipient over the telephone network, the call recipient corresponding to the call recipient number.

45. The computer program product of claim 44 wherein the call recipient is adapted to display one or more of the additional caller attributes on a display.

* * * * *